United States Patent
Wang et al.

(10) Patent No.: US 11,489,947 B2
(45) Date of Patent: Nov. 1, 2022

(54) RELAY NODE AND METHOD FOR ENCAPSULATING A PACKET BASED ON TUNNELING PROTOCOL

(71) Applicant: INSTITUTE FOR INFORMATION INDUSTRY, Taipei (TW)

(72) Inventors: Jing-Ping Wang, Taipei (TW); Wen-Yao Chang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 34 days.

(21) Appl. No.: 17/105,649

(22) Filed: Nov. 27, 2020

(65) Prior Publication Data
US 2022/0141321 A1    May 5, 2022

(30) Foreign Application Priority Data
Nov. 5, 2020   (TW) .................. 109138706

(51) Int. Cl.
*H04B 7/155*   (2006.01)
*H04L 12/46*   (2006.01)
(Continued)

(52) U.S. Cl.
CPC ......... *H04L 69/22* (2013.01); *H04B 7/15521* (2013.01); *H04L 12/4633* (2013.01); *H04L 2212/00* (2013.01)

(58) Field of Classification Search
CPC ............ H04B 7/15521; H04L 12/4633; H04L 29/06095; H04L 29/06102;
(Continued)

(56) References Cited

U.S. PATENT DOCUMENTS 6,687,833 B1 *  2/2004  Osborne ................ H04L 63/10
                                                          713/162
6,839,339 B1     1/2005  Chuah
                                (Continued)

OTHER PUBLICATIONS

The Examination Report of the corresponding Taiwanese application No. 109138706 dated May 31, 2021.
(Continued)

*Primary Examiner* — Alpus Hsu
(74) *Attorney, Agent, or Firm* — CKC & Partners Co., LLC

(57) ABSTRACT

A relay node and method for encapsulating a packet based on a tunneling protocol. The relay node includes a communication device, a storage device, and a processor. The communication device communicates with a receiving node and a transmitting node; the storage device stores multiple instructions; and the processor is coupled to the communication device and the storage device for loading and executing the multiple instructions stored in the storage device to: control the communication device to receive a packet transmitted by the transmitting node; generate a protocol header related to the packet based on the packet, and calculate a checksum as a checksum block in the multiple sections using multiple sections in the protocol header at least; generate an encapsulated packet including the protocol header and the packet; and transmit the encapsulated packet to the receiving node through the communication device for verifying the checksum block.

13 Claims, 6 Drawing Sheets

(51) Int. Cl.
*H04L 29/06* (2006.01)
*H04L 69/22* (2022.01)

(58) Field of Classification Search
CPC ......... H04L 29/06122; H04L 29/06129; H04L 29/06142; H04L 29/06156; H04L 47/196; H04L 69/16; H04L 69/165; H04L 69/167; H04L 69/169; H04L 69/22; H04L 2212/00

See application file for complete search history.

(56) References Cited

U.S. PATENT DOCUMENTS

| | | | | |
|---|---|---|---|---|
| 7,209,491 B2* | 4/2007 | Zheng | ............... | H04L 69/04 455/72 |
| 7,328,283 B2* | 2/2008 | Tan | ............... | H04L 69/04 709/236 |
| 7,706,367 B2* | 4/2010 | Das | ............... | H04L 61/2521 370/392 |
| 7,843,910 B2* | 11/2010 | Loughran | ............. | H04L 63/164 370/401 |
| 8,774,038 B2* | 7/2014 | Sarikaya | ............... | H04L 69/167 370/254 |
| 8,817,816 B2* | 8/2014 | Sarikaya | ............... | H04L 12/185 370/466 |
| 8,902,886 B2* | 12/2014 | Franke | ................... | H04L 69/12 709/212 |
| 9,258,218 B2* | 2/2016 | Hampel | .................. | H04L 45/38 |
| 9,258,272 B1* | 2/2016 | Durand | ................... | H04L 63/30 |
| 9,294,506 B2* | 3/2016 | Swartz | ................... | H04L 63/164 |
| 9,325,812 B2* | 4/2016 | Zhu | ........................ | H04L 69/22 |
| 9,467,535 B2* | 10/2016 | Zhou | ....................... | H04L 69/08 |
| 9,641,435 B1* | 5/2017 | Sivaramakrishnan | ....................... | H04L 69/166 |
| 10,382,331 B1* | 8/2019 | Sivaramakrishnan | .. | H04L 45/66 |
| 2007/0011560 A1 | 1/2007 | Backman et al. | | |
| 2011/0007754 A1 | 1/2011 | Pepper et al. | | |
| 2013/0042168 A1 | 2/2013 | Bender et al. | | |
| 2016/0150055 A1* | 5/2016 | Choi | ...................... | H04L 69/22 370/401 |
| 2020/0314219 A1* | 10/2020 | Watson | ............... | H04L 49/9036 |
| 2021/0068007 A1* | 3/2021 | Jaju | ......................... | H04L 45/74 |

OTHER PUBLICATIONS

The Extended European Search Report of the corresponding European application No. 20211170.4 dated May 17, 2021.

* cited by examiner

RELAY NODE AND METHOD FOR ENCAPSULATING A PACKET BASED ON TUNNELING PROTOCOL

CROSS-REFERENCE TO RELATED APPLICATION

This application claims priority to Taiwan Application Serial Number 109138706, filed Nov. 5, 2020, which is herein incorporated by reference in its entirety.

BACKGROUND

Field of Disclosure

The present disclosure relates to a general packet radio service tunneling protocol (GTP) technology. More particularly, the present disclosure relates to the relay node and method for encapsulating a packet based on a tunneling protocol.

Description of Related Art

As far as the current general packet radio service tunneling protocol (GTP) is concerned, when a new packet is encapsulated based on GTP, it is usually necessary to first calculate the checksum of the user datagram protocol (UDP) in the header of the packet, and fill this checksum into the block corresponding to the header encapsulated in this packet.

However, when calculating the checksum, it is often necessary to use the header and the payload in the packet to perform complex calculations (i.e. it verifies and calculates the checksum using all the bits in the header and all the bits in the payload). It causes a waste of computing resources. Therefore, how to reduce the computing resources required to calculate the above-mentioned checksum is an urgent problem for those skilled in the art.

SUMMARY

The present disclosure provides a relay node based on a tunneling protocol, comprising a communication device, a storage device, and a processor. The communication device communicates with a receiving node and a transmitting node; the storage device stores a plurality of instructions; and the processor is coupled to the communication device and the storage device for loading and executing the plurality of instructions stored in the storage device to: control the communication device to receive a packet transmitted by the transmitting node; generate a protocol header related to the packet based on the packet, and calculate a checksum as a checksum block in a plurality of sections using the plurality of sections in the protocol header at least; generate an encapsulated packet, wherein the encapsulated packet comprises the protocol header and the packet; and transmit the encapsulated packet to the receiving node through the communication device for the receiving node to verify the checksum block.

The present disclosure provides a method for encapsulating a packet based on the tunneling protocol. The method comprises: generating a protocol header related to a packet based on the packet received from a transmitting node, and calculating a checksum as a checksum block in a plurality of sections using the plurality of sections in the protocol header at least, wherein the plurality of sections comprises a general packet radio service tunneling protocol (GTP) section; generating an encapsulated packet, wherein the encapsulated packet comprises the protocol header and the packet; and transmitting the encapsulated packet to the receiving node through the communication device for the receiving node to verify the checksum block.

Based on the above, the embodiment of the present disclosure can directly use multiple specific sections in the header of the packet to be transmitted, to calculate the checksum of the user datagram protocol (UDP) for GTP. In this way, the checksum calculation of the packet can be accelerated to reduce computing resources, and the packet processing speed can be increased, thereby improving the performance of the transmission traffic.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
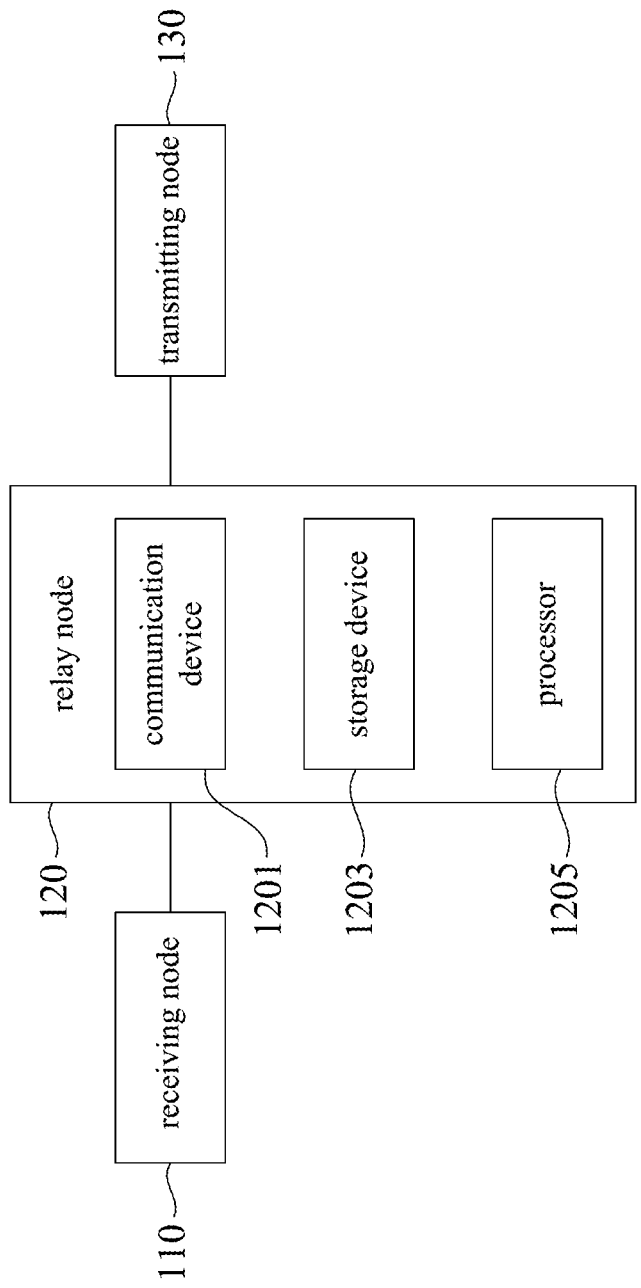
FIG. 1 is a block diagram of a relay node according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a block diagram of a relay node according to an embodiment of the present disclosure. Referring to FIG. 1, a relay node 120 is connected between a receiving node 110 and a transmitting node 130. The relay node 120 can be a node applicable to the general packet radio service tunneling protocol (GTP). In other words, the relay node 120 can be a node that applies GTP in any communication system architecture, and there is no particular restriction on the network architecture that the relay node 120 can apply.

In some embodiments, the relay node 120 can be a node applicable to GTP in the 5th generation mobile networks (5G).

Figure 2:
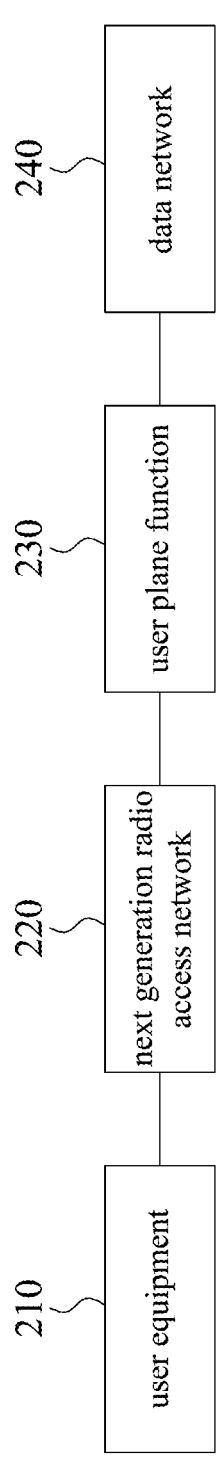
FIG. 2 is a block diagram of part of the network architecture of 5th generation mobile networks (5G) according to an embodiment of the present disclosure.

For example, FIG. 2 is a block diagram of part of the network architecture of 5G according to an embodiment of the present disclosure. Referring to FIG. 2, from the perspective of downlink, a user plane function (UPF) 230 can be configured as the above-mentioned relay node, a data network (DN) 240 can be configured as the above-mentioned transmitting node, and a next generation radio access network (RAN) (or a next generation nodeB (gNB)) 220 can be configured as the above-mentioned receiving node.

On the contrary, from the perspective of uplink, a RAN 220 can be configured as the above-mentioned relay node, a user equipment (UE) 210 can be configured as the above-mentioned transmitting node, and a UPF 230 be configured as the above-mentioned receiving node.

Referring to FIG. 1, in other embodiments, the relay node 120 can also be a node applicable to GTP in the 4th generation mobile networks (4G).

Figure 3:
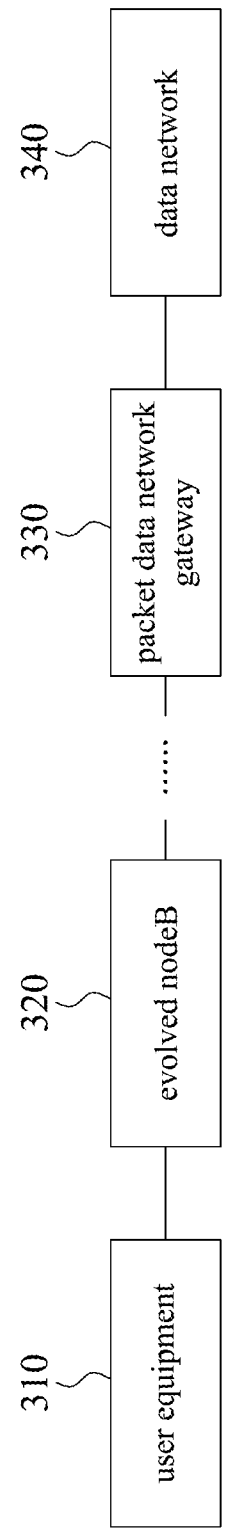
FIG. 3 is a block diagram of part of the network architecture of 4th generation mobile networks (4G) according to an embodiment of the present disclosure.

For example, FIG. 3 is a block diagram of part of the network architecture of 4G according to an embodiment of the present disclosure. Referring to FIG. 3, from the perspective of downlink, a packet data network gateway (P-GW) 330 can be configured as the above-mentioned relay node, a data network (DN) 340 can be configured as the above-mentioned transmitting node, and an evolved nodeB (eNB) 320 can be configured as the above-mentioned receiving node.

On the contrary, from the perspective of uplink, the eNB 320 can be configured as the above-mentioned relay node, the UE 310 can be configured as the above-mentioned transmitting node, and the P-GW 330 can be configured as the above-mentioned receiving node.

Referring to FIG. 1, the relay node 120 includes a communication device 1201, a storage device 1203, and a processor 1205. The communication device 1201 can communicate with the receiving node 110 and the transmitting node 130. The storage device 1203 can store multiple instructions. The processor 1205 can be coupled to the communication device 1201 and the storage device 1203, and configured to load and execute the multiple instructions stored in the storage device 1203.

In some embodiments, the communication device 1201, the storage device 1203, and the processor 1205 can be virtual or physical devices, can be a device composed of multiple virtual or physical devices, or can be a device composed of a mixture of virtual devices and physical devices.

Figure 4:
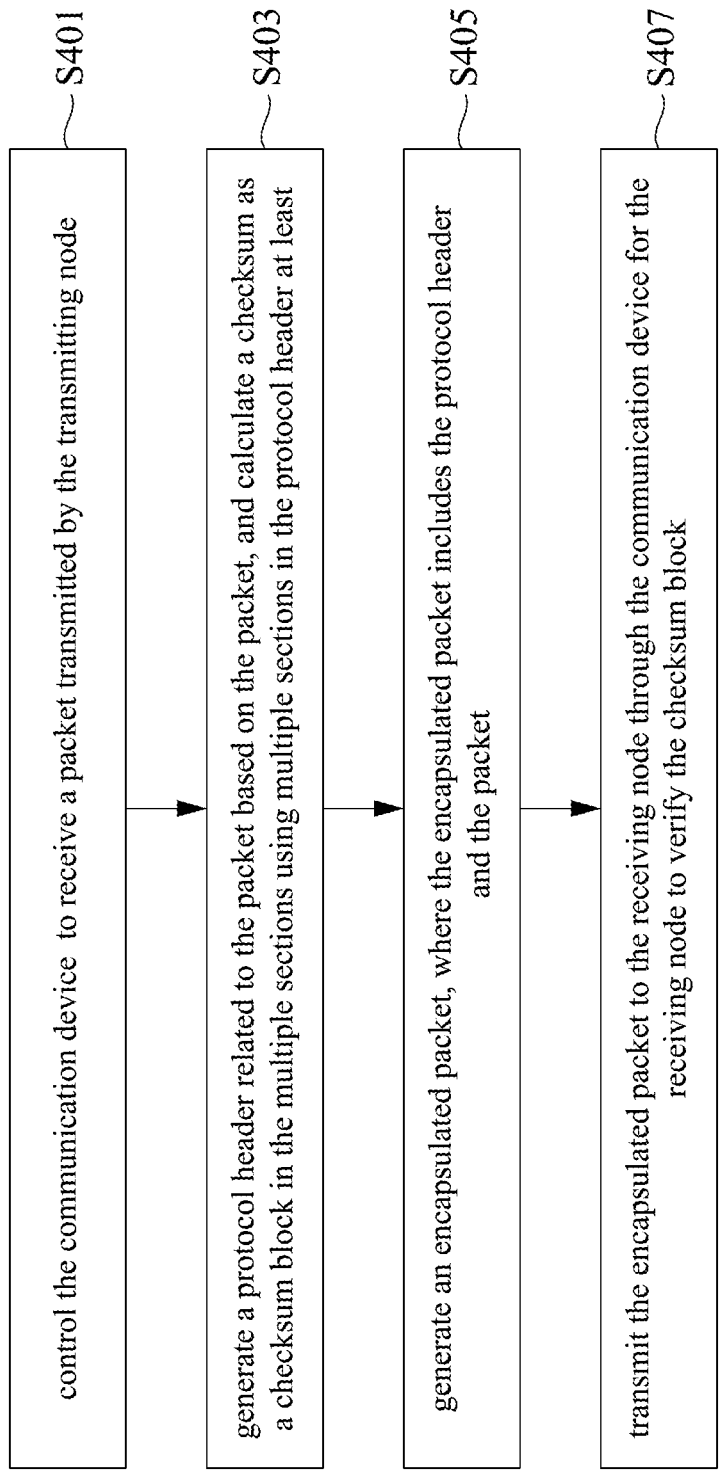
FIG. 4 is a flowchart of a method for encapsulating a packet according to an embodiment of the present disclosure.

FIG. 4 is a flowchart of a method for encapsulating a packet according to an embodiment of the present disclosure. The method of the embodiment shown in FIG. 4 is applicable to the relay node 120 in FIG. 1, but is not limited to this. For the sake of convenience and clear description, the detailed steps of the method for encapsulating a packet shown in FIG. 4 can be described in the following with reference to FIG. 1 and FIG. 4 at the same time.

First, in step S401, the processor 1205 can control the communication device 1201 to receive a packet transmitted by the transmitting node 130. In other words, the relay node 120 can receive the packet from the transmitting node 130 through the communication device 1201.

Next, in step S403, the processor 1205 can generate a protocol header related to the packet based on the packet, and calculate a checksum as a checksum block in the multiple sections using multiple sections in the protocol header at least. In other words, the processor 1205 can generate a protocol header corresponding to the encapsulated packet to be transmitted using the received packet, and calculate a checksum using the bits of the multiple sections in the protocol header at least, thereby indicating the checksum as the check block in the multiple sections.

In some embodiments, the packet includes a data transmission header and a data section. The processor 1205 can select a pseudo block from the data transmission header, and calculate the checksum using the pseudo block and the multiple sections which are in the protocol header.

In further embodiments, the data transmission header includes a transmission control protocol/user datagram protocol (TCP/UDP) section and an internet protocol version 4 (IPv4) section, and the pseudo block can be a pseudo internet protocol version 4 (pseudo IPv4) block (the size of this block is usually 12 bytes) selected by the processor 1205 from the data transmission header.

In further embodiments, the processor 1205 can select an encapsulated pseudo block from the multiple sections in the protocol header, and select multiple subsections from these sections except the IPv4 section, thereby calculating the checksum using the above-mentioned pseudo block, the above-mentioned encapsulated pseudo block, and the above-mentioned multiple subsections.

In some embodiments, the processor 1205 can select the pseudo block from the above-mentioned packet, and select an encapsulated pseudo block (the size of this block is usually 12 bytes) from the multiple sections in the protocol header. Besides, the processor 1205 can select a UDP section and a GTP section as the multiple subsections from the multiple sections in the protocol header. In this way, the processor 1205 can calculate the checksum according to the above-mentioned multiple subsections, the above-mentioned pseudo block, and the above-mentioned encapsulated pseudo block.

It is worth noting that the pseudo block (the size of this block is usually 12 bytes) is the data extracted from the IPv4 section in the data transmission header, and the encapsulated pseudo block is the data extracted from the encapsulated internet protocol version 4 section (i.e. encapsulated IPv4 section) in the protocol header.

Figure 5:
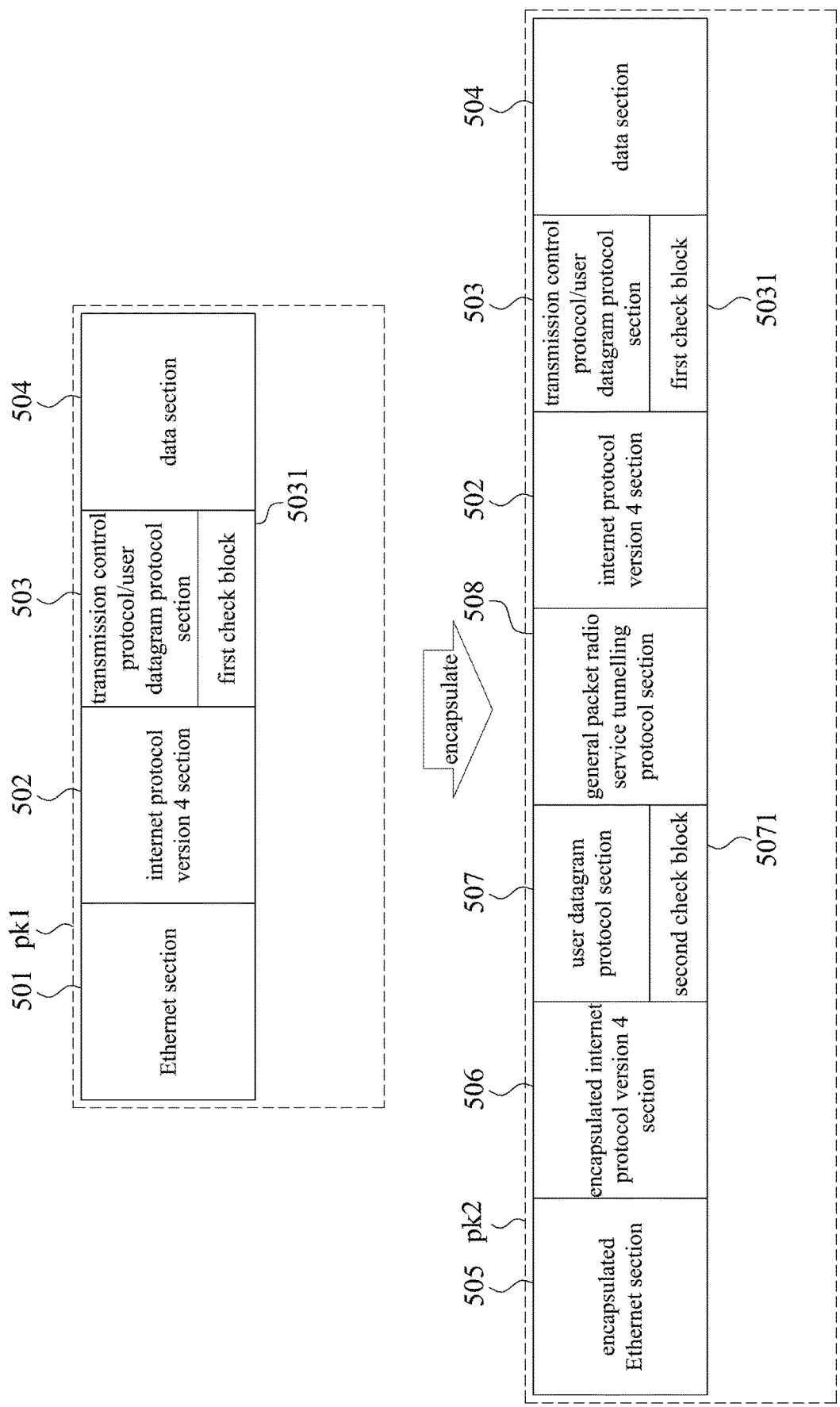
FIG. 5 is a schematic diagram of the packet encapsulation according to an embodiment of the present disclosure.

For example, taking the packet of TCP/UDP and IPv4 in the 5G network architecture as an example, FIG. 5 is a schematic diagram of packet encapsulation according to an embodiment of the present disclosure. Referring to FIGS. 1 and 5 at the same time, a packet pk1 received by the processor 1205 includes a data transmission header and a data section 504 (i.e. a payload).

Further, the data transmission header includes an Ethernet section 501, an IPv4 section 502, and a TCP/UDP section 503, where the TCP/UDP section 503 further includes a first check block 5031.

In response to the packet pk1, the processor 1205 can encapsulate the packet pk1 into an encapsulated packet pk2 including an encapsulated Ethernet section 505, an encapsulated IPv4 section 506, a UDP section 507, and a GTP section 508. In this way, the processor 1205 can select a pseudo IPv4 block and an encapsulated pseudo IPv4 block from the IPv4 section 502 and the encapsulated IPv4 section 506 respectively, and perform a checksum calculation using the UDP section 507, the GTP section 508, the encapsulated pseudo IPv4 block, and the pseudo IPv4 block in the packet pk1 directly, to generate a checksum (i.e. for these sections, it takes 16 bits as a unit and add each unit in the method of 1's complement, thereby taking 1's complement to the result of the addition as the checksum).

By this, the processor 1205 can fill the generated checksum into the second check block 5071 in the UDP section 507. In other words, for the packet of the TCP/UDP and IPv4 in the 5G network architecture, when the packet is encapsulated based on GTP, compared with the method of calculating the checksum in the prior art, the present disclosure calculates in the method of the 1's complement, and taking 1's complement to the first check block 5031 (the first check block 5031 includes the complement of the TCP/UDP section 503 and the complement of the data section 504). Therefore, the bits of the data in the TCP/UDP section 503 and the data section 504 in all the sections used for the calculation can be offset and deleted in the calculation.

Based on this, when calculating in the method of the 1's complement, the method of calculating the checksum of the present disclosure does not need to refer to bits of data in the Ethernet section 501, all of the IPv4 section 502, the TCP/UDP section 503, the data section 504, and the encapsulated Ethernet section 505, but only needs to use the UDP section 507, the GTP section 508, the encapsulated pseudo IPv4 block and the pseudo IPv4 block to calculate the checksum of the second check block 5071 in the UDP section 507. In this way, computing resources can be greatly reduced.

Furthermore, referring to FIG. 1 and FIG. 4 at the same time, in further embodiments, the packet includes a data control header, and the data control header includes an internet control message protocol (ICMP) section and an IPv4 section.

In some embodiments, the processor 1205 can select an encapsulated pseudo IPv4 block from the multiple sections in the protocol header, and select the UDP section and the GTP section as multiple subsections, thereby calculating the checksum according to the multiple subsections and the encapsulated pseudo IPv4 block.

Figure 6:
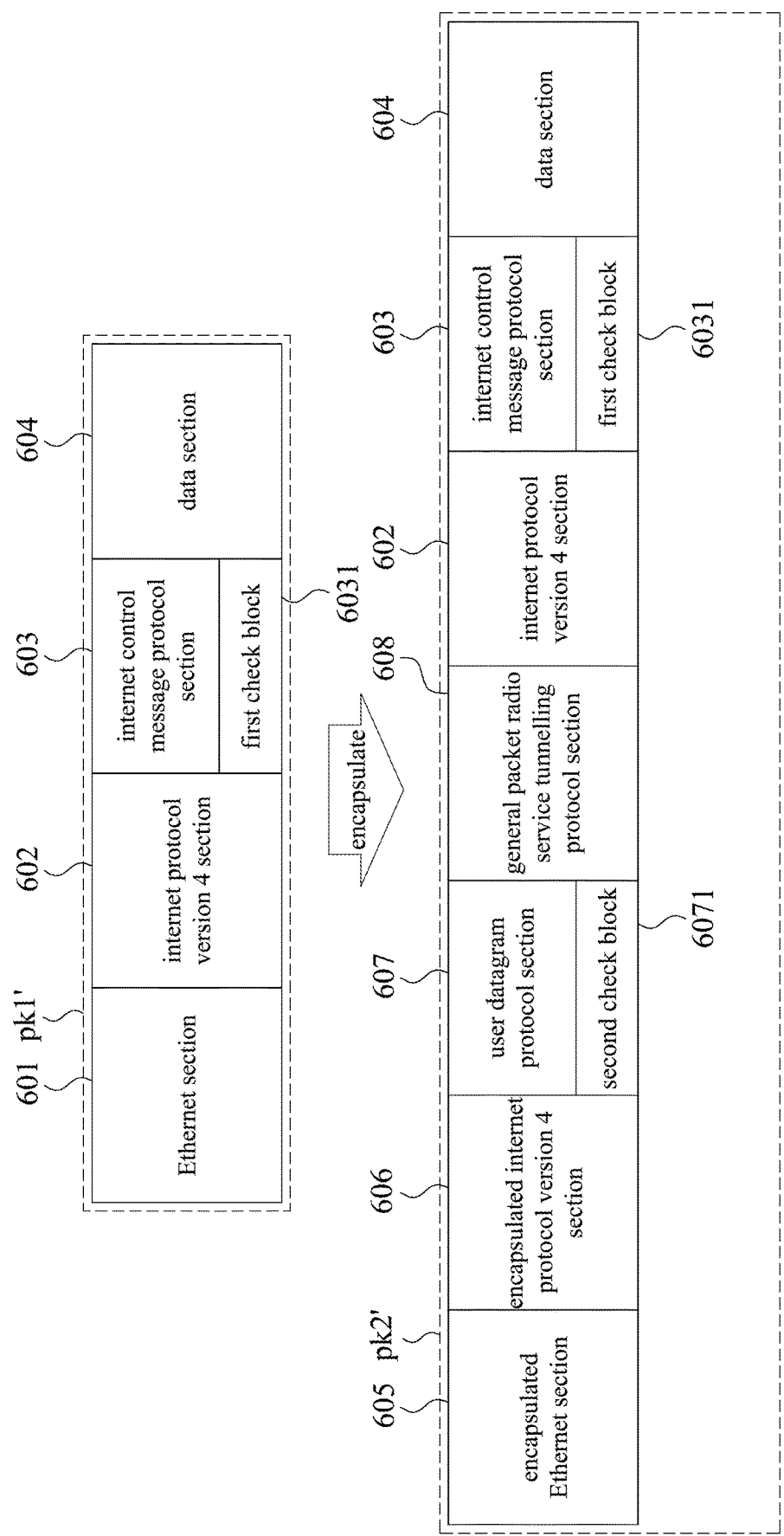
FIG. 6 is a schematic diagram of the packet encapsulation according to another embodiment of the present disclosure.

For example, taking the packet of ICMP and IPv4 in the 5G network architecture as an example, FIG. 6 is a schematic diagram of packet encapsulation according to another embodiment of the present disclosure. Referring to FIGS. 1 and 6 at the same time, the packet pk1' received by the processor 1205 includes a data control header and a data section 604.

Further, the data control header includes an Ethernet section 601, an IPv4 section 602, and an ICMP section 603, where the ICMP section 603 further includes a first check block 6031.

In response to the packet pk1', the processor 1205 can encapsulate the packet pk1' into an encapsulated packet pk2' including an encapsulated IPv4 section 606, a UDP section 607, and a GTP section 608. In this way, the processor 1205 can select the encapsulated pseudo IPv4 block from the encapsulated IPv4 section 606, and perform a checksum calculation using the UDP section 607, the GTP section 608, and the encapsulated pseudo IPv4 block directly, to generate a checksum. By this, the processor 1205 can fill the generated checksum into the second check block 6071 in the UDP section 607.

In other words, for the packet of the ICMP and IPv4 in the 5G network architecture, when the packet is encapsulated based on GTP, compared with the method of calculating the checksum in the prior art, the present disclosure calculates in the method of the 1's complement, taking 1's complement to the first check block 6031 (the first check block 6031 includes the complement of the ICMP section 603 and the complement of the data section 604), thus the bits of the data in the IPv4 section 602, the ICMP section 603 and the data section 604 in all the sections used for the calculation can be offset and deleted in the calculation.

Therefore, when calculating in the method of the 1's complement, the method of calculating the checksum of the present disclosure does not need to refer to bits of data in the Ethernet section 601, the all IPv4 section 602, the ICMP section 603, the data section 604, and the encapsulated Ethernet section 605, but only needs to use the UDP section 607, the GTP section 608 and the encapsulated pseudo IPv4 block to calculate the checksum of the second check block 6071 in the UDP section 607. In this way, computing resources can be greatly reduced too.

Furthermore, referring back to FIGS. 1 and 4 at the same time, in some embodiments, the packet includes a data transmission or data control header, the processor 1205 can select a pseudo block and an internet protocol version 6 (IPv6) section from the data transmission or data control header, and calculate the checksum using the pseudo block, the IPv6 section, and multiple sections which are in the protocol header.

In further embodiments, the data transmission or data control header includes a transmission control protocol/user datagram protocol/internet control message protocol version 6 (TCP/UDP/ICMPv6) section, and the pseudo block can be a pseudo internet protocol version 6 (pseudo IPv6) block (the size of this block is usually 40 bytes) selected by the processor 1205 from the data transmission or data control header.

In further embodiments, the processor 1205 can select an encapsulated pseudo block from the multiple sections in the protocol header, and select multiple subsections from these sections except the IPv4 section, thereby calculating the checksum using the above-mentioned pseudo block, the above-mentioned encapsulated pseudo block, the IPv6 section, and the above-mentioned multiple subsections.

In some embodiments, the processor 1205 can select the pseudo block and the IPv6 section from the above-mentioned packet, and select an encapsulated pseudo block (the size of this block is usually 12 bytes) from the multiple sections in the protocol header, thereby selecting a UDP section and a GTP section as the multiple subsections from the multiple sections in the protocol header. In this way, the processor 1205 can calculate the checksum according to the above-mentioned multiple subsections, the above-mentioned pseudo block, the above-mentioned IPv6 section, and the above-mentioned encapsulated pseudo block.

It is worth noting that the pseudo block (the size of this block is usually 40 bytes) is the data extracted from the IPv6 section in the data transmission or data control header. At this time, the pseudo block is called a pseudo IPv6 block, and the encapsulated pseudo block is the data extracted from the encapsulated IPv4 section in the protocol header.

Figure 7:
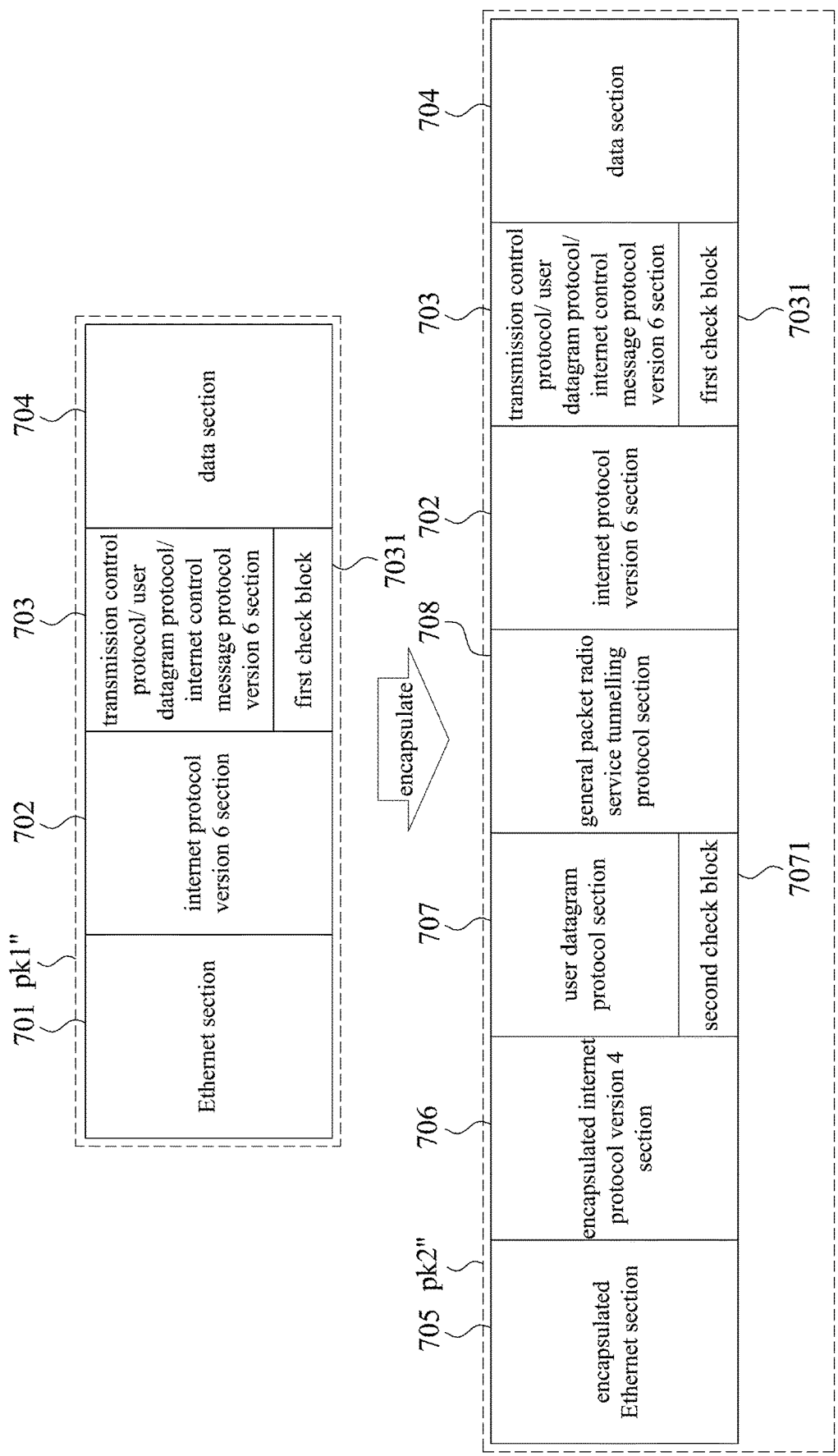
FIG. 7 is a schematic diagram of the packet encapsulation according to another embodiment of the present disclosure.

For example, taking the packet of TCP/UDP/ICMPv6 and IPv4 in the 5G network architecture as an example, FIG. 7 is a schematic diagram of packet encapsulation according to another embodiment of the present disclosure. Referring to FIGS. 1 and 7 at the same time, a packet pk1" received by the processor 1205 includes a data transmission or data control header and a data section 704.

Further, the data transmission or data control header includes an Ethernet section 701, an IPv6 section 702, and a TCP/UDP/ICMPv6 section 703, where the TCP/UDP/ICMPv6 section 703 further includes a first check block 7031.

In response to the packet pk1", the processor 1205 can encapsulate the packet pk1" into an encapsulated packet pk2" including an encapsulated Ethernet section 705, an encapsulated IPv4 section 706, a UDP section 707, and a GTP section 708. In this way, the processor 1205 can select a pseudo IPv6 block and an encapsulated pseudo IPv4 block from the IPv6 section 702 and the encapsulated IPv4 section 706 respectively, and perform a checksum calculation using the UDP section 707, the GTP section 708, the encapsulated pseudo IPv4 block, and the pseudo IPv6 block and the IPv6 section 702 (the pseudo IPv6 block and the IPv6 section 702 are in the packet pk1") directly, to generate a checksum (i.e. for these sections and blocks, it takes 16 bits as a unit and add each unit in the method of 1's complement, thereby taking 1's complement to the result of the addition as the checksum).

By this, the processor 1205 can fill the generated checksum into the second check block 7071 in the UDP section 707. In other words, when the packet is encapsulated based on GTP, compared with the method of calculating the checksum in the prior art, the present disclosure calculates in the method of the 1's complement, and taking 1's complement to the first check block 7031 (the first check block 7031 includes the complement of the TCP/UDP/ICMPv6 section 703 and the complement of the data section 704). Therefore, the bits of the data in the TCP/UDP/ICMPv6 section 703 and the data section 704 in all the sections used for the calculation can be offset and deleted in the calculation.

Based on this, when calculating in the method of the 1's complement, the method of calculating the checksum of the present disclosure does not need to refer to bits of data in the Ethernet section 701, the all encapsulated IPv4 section 706, the TCP/UDP/ICMPv6 section 703, the data section 704, and the encapsulated Ethernet section 705, but only needs to use the UDP section 707, the GTP section 708, the encapsulated pseudo IPv4 block, the IPv6 section 702 and the pseudo IPv6 block to calculate the checksum of the second check block 7071 in the UDP section 707.

Next, referring back to FIG. 1 and FIG. 4 at the same time, in step S405, the processor 1205 can generate an encapsulated packet, where the encapsulated packet includes the protocol header and the packet. In other words, the processor 1205 can encapsulate the protocol header into the packet to generate an encapsulated packet.

For example, referring to FIG. 1 and FIG. 5 at the same time, the processor 1205 can encapsulate the encapsulated IPv4 section 506, the UDP section 507, and the GTP section 508 (i.e. the protocol header related to the packet pk1 contains these sections) into the data transmission header in the packet pk1 to generate the protocol header of the encapsulated packet pk2. In this way, the processor 1205 can encapsulate the protocol header of the encapsulated packet pk2 and the data section 504 to generate the encapsulated packet pk2.

In another example, referring to FIG. 1 and FIG. 6 at the same time, the processor 1205 can encapsulate the encapsulated IPv4 section 606, the UDP section 607, and the GTP section 608 (i.e. the protocol header related to the packet pk1' contains these sections) into the data control header in the packet pk1' to generate the protocol header of the encapsulated packet pk2'. In this way, the processor 1205 can encapsulate the protocol header of the encapsulated packet pk2' and the data section 604 to generate the encapsulated packet pk2'.

In another example, referring to FIG. 1 and FIG. 7 at the same time, the processor 1205 can encapsulate the encapsulated IPv4 section 706, the UDP section 707, and the GTP section 708 (i.e. the protocol header related to the packet pk1" contains these sections) into the data transmission or data control header in the packet pk1" to generate the protocol header of the encapsulated packet pk2". In this way, the processor 1205 can encapsulate the protocol header of the encapsulated packet pk2" and the data section 704 to generate the encapsulated packet pk2".

Finally, in step S407, the processor 1205 can transmit the encapsulated packet to the receiving node 110 through the communication device 1201 for the receiving node 110 to verify the checksum block. In other words, the relay node 120 can transmit the encapsulated packet to the receiving node 110 through the communication device 1201. In this way, the receiving node 110 verifies the check block in the encapsulated packet to determine whether the encapsulated packet has bit errors during the transmission process.

In some embodiments, the receiving node 110 can verify the checksum in the check block of the UDP section in the encapsulated packet to determine whether the encapsulated packet has bit errors during the transmission process.

Through the above steps, the relay node 120 of the embodiment of the present disclosure can calculate the checksum of the UDP of the packet to be transmitted more efficiently. In this way, excessive waste of computing resources for calculating the checksum can be avoided.

In summary, for GTP, the relay node provided by the present disclosure only needs to use multiple specific sections in the generated header to generate the UDP checksum of the packet to be transmitted after generating the header of the packet to be transmitted. In this way, the checksum calculation of the packet can be accelerated to reduce computing resources, and the packet processing speed can be increased, thereby improving the performance of the transmission traffic.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A relay node based on a tunneling protocol, comprising:
   a communication device, communicated with a receiving node and a transmitting node;
   a storage device, being configured to store a plurality of instructions; and
   a processor, coupled to the communication device and the storage device for loading and executing the plurality of instructions stored in the storage device to:
   control the communication device to receive a packet transmitted by the transmitting node;
   generate a protocol header related to the packet based on the packet, and calculate a checksum as a checksum block in a plurality of sections at least using the plurality of sections in the protocol header, wherein the plurality of sections comprises an encapsulated pseudo internet protocol version 4 (encapsulated pseudo IPv4) block, a user datagram protocol (UDP) section and a general packet radio service tunneling protocol (GTP) section;
   generate an encapsulated packet, wherein the encapsulated packet comprises the protocol header and the packet; and
   transmit the encapsulated packet to the receiving node through the communication device for the receiving node to verify the checksum block.

2. The relay node of claim 1, wherein the packet comprises a data transmission header and a data section, wherein the processor is further configured to:
   select a pseudo block from the data transmission header, and calculate the checksum using the pseudo block and the plurality of sections which are in the protocol header.

3. The relay node of claim 2, wherein the data transmission header at least comprises an internet protocol version 4 (IPv4) section and a transmission control protocol/user datagram protocol (TCP/UDP) section, and the processor is further configured to calculate the checksum without using the data section and the transmission control protocol/user datagram protocol section.

4. The relay node of claim 1, wherein the packet comprises a data transmission header and a data section, and the processor is further configured to:
   select a pseudo internet protocol version 4 (pseudo IPv4) block from the data transmission header;
   select the encapsulated pseudo IPv4 block from the plurality of sections in the protocol header;
   select the UDP section and the GTP section from the plurality of sections as a plurality of subsections; and
   calculate the checksum only based on the plurality of subsections, the pseudo IPv4 block, and the encapsulated pseudo IPv4 block.

5. The relay node of claim 1, the packet comprises a data control header and a data section, and the data control header at least comprises an internet protocol version 4 section and an internet control message protocol (ICMP) section, wherein the processor is further configured to calculate the checksum without using the data section, the internet protocol version 4 section, and the internet control message protocol section.

6. The relay node of claim 1, wherein the processor is further configured to:
   select the encapsulated pseudo IPv4 block from the plurality of sections in the protocol header;
   select the UDP section and the GTP section from the plurality of sections as a plurality of subsections; and
   calculate the checksum only based on the plurality of subsections and the encapsulated pseudo IPv4 block.

7. The relay node of claim 1, wherein the packet comprises a data transmission or data control header, and the processor is further configured to:
   select an internet protocol version 6 (IPv6) section and a pseudo internet protocol version 6 (pseudo IPv6) block from the data transmission or data control header;
   select the encapsulated pseudo IPv4 block from the plurality of sections in the protocol header;
   select the UDP section and the GTP section from the plurality of sections as a plurality of subsections; and
   calculate the checksum by only using the plurality of subsections, the IPv6 section, the pseudo IPv6 block, and the encapsulated pseudo IPv4 block.

8. A method for encapsulating a packet based on a tunneling protocol, comprising:
   generating a protocol header related to a packet based on the packet received from a transmitting node, and at least using a plurality of sections in the protocol header to calculate a checksum as a checksum block in the plurality of sections, wherein the plurality of sections comprises an encapsulated pseudo block, a user datagram protocol (UDP) section and a general packet radio service tunneling protocol (GTP) section;
   generating an encapsulated packet, wherein the encapsulated packet comprises the protocol header and the packet; and
   transmitting the encapsulated packet to the receiving node through a communication device for the receiving node to verify the checksum block.

9. The method for encapsulating a packet of claim 8, wherein the packet comprises a data transmission header and a data section, and the step of at least using the plurality of sections in the protocol header to calculate the checksum as the checksum block in the plurality of sections further comprises:
   selecting a pseudo block from the data transmission header, and calculating the checksum using the pseudo block and the plurality of sections which are in the protocol header.

10. The method for encapsulating a packet of claim 9, wherein the step of calculating the checksum using the pseudo block and the plurality of sections which are in the protocol header further comprises:
    selecting the encapsulated pseudo block from the plurality of sections in the protocol header, and selecting a plurality of subsections from the plurality of sections except for an internet protocol version 4 (IPv4) section; and
    calculating the checksum by only using the pseudo block, the encapsulated pseudo block and the plurality of subsections.

11. The method for encapsulating a packet of claim 8, wherein the packet comprises a data control header and a data section, and the step of at least using the plurality of sections in the protocol header to calculate the checksum as the checksum block in the plurality of sections further comprises:
    selecting the encapsulated pseudo block from the plurality of sections in the protocol header, and selecting a plurality of subsections from the plurality of sections except for an internet protocol version 4 (IPv4) section to calculate the checksum by only using the encapsulated pseudo block and the plurality of subsections.

12. The method for encapsulating a packet of claim 8, the packet comprises a data transmission or data control header and a data section, and the step of at least using the plurality of sections in the protocol header to calculate the checksum as the checksum block in the plurality of sections further comprises:
    selecting an encapsulated pseudo internet protocol version 4 (pseudo IPv4) block from the plurality of sections in the protocol header;
    selecting the UDP section and the GTP section from the plurality of sections as a plurality of subsections;
    selecting a pseudo internet protocol version 6 (pseudo IPv6) block and an internet protocol version 6 (IPv6) section from the data transmission or data control header; and
    calculating the checksum by only using the plurality of subsections, the pseudo IPv6 block, the IPv6 section, and the encapsulated pseudo IPv4 block.

13. The method for encapsulating a packet of claim 12, wherein the data transmission or data control header at least comprises the IPv6 section and a transmission control protocol/user datagram protocol/internet control message protocol version 6 (TCP/UDP/ICMPv6) section, and the step of at least using the plurality of sections in the protocol header to calculate the checksum as the checksum block in the plurality of sections is further configured to calculate the checksum without using the data section and the TCP/UDP/ICMPv6 section.

* * * * *